United States Patent

Hamilton

[15] 3,688,483
[45] Sept. 5, 1972

[54] MULTI-PURPOSE HOUSEHOLD GARDEN AND YARD HAND TOOL

[72] Inventor: David H. Hamilton, 7060 N. Mill Road, Rockford, Ill. 61108

[22] Filed: May 18, 1971

[21] Appl. No.: 144,530

[52] U.S. Cl. ............. 56/400.11, 56/328 R, 56/339, 56/400.06, 294/19 R, 294/55
[51] Int. Cl. ............................................. A01d 7/10
[58] Field of Search ............. 56/400.01–400.21, 56/339, 340, 328 R; 294/19 R, 19 A, 26.5, 51, 52, 55

[56] References Cited

UNITED STATES PATENTS

| | | |
|---|---|---|
| 354,355 | 12/1886 | Seatter .................... 56/400.06 |
| 415,599 | 11/1889 | Woodworth ............. 56/400.06 |
| 578,558 | 3/1897 | Fuller et al. ............. 56/400.06 |
| 1,095,585 | 5/1914 | Mack ....................... 56/328 R |
| 1,235,371 | 7/1917 | Paul .......................... 56/340 |
| 1,866,754 | 7/1932 | Crane ...................... 56/400.13 |
| 2,427,486 | 9/1947 | Wyland ...................... 294/55 |
| 2,652,680 | 9/1953 | Adams ..................... 56/400.11 |
| 2,792,683 | 5/1957 | Sigler ...................... 56/328 R |
| 3,431,008 | 3/1969 | Narita ......................... 294/55 |
| 3,606,436 | 9/1971 | Lynch ...................... 294/19 R |

Primary Examiner—Russell R. Kinsey
Attorney—Andrew F. Wintercorn

[57] ABSTRACT

This hand tool has a yoke on one end of the handle with a scraping or hoe blade on one side and rake teeth on the other side in the same plane with the blade. A generally U-shaped spring wire clip fits over the yoke to fasten the opened mouth end of a bag onto the yoke with either the rake teeth forward or the blade forward relative to the open mouth of the bag to enable collecting refuse in the bag. The cross portion of the U-shaped spring wire clip grips the mouth end of the bag across the yoke its full width and the arms do the same on both sides of the yoke and are retained in outwardly projecting hooks provided on both sides of the upper end of the yoke where it is fastened to the handle. When not used for refuse collection, the hand tool does double duty as a combination garden hoe and rake.

13 Claims, 5 Drawing Figures

PATENTED SEP 5 1972　　　　　　　　　　　3,688,483
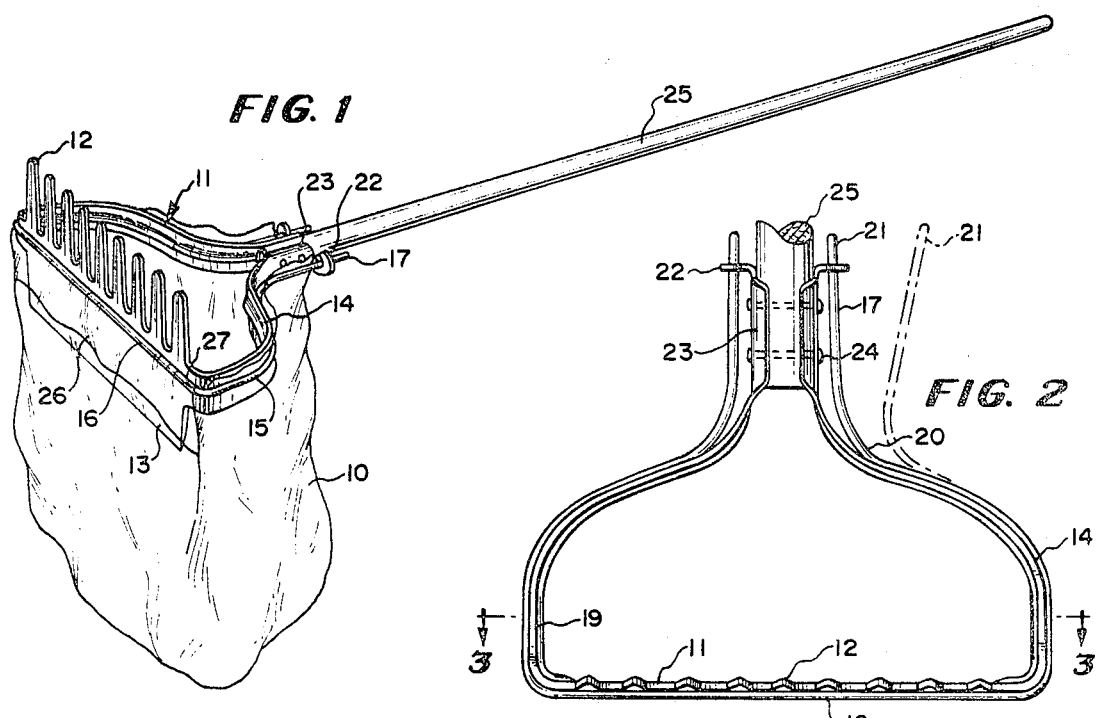
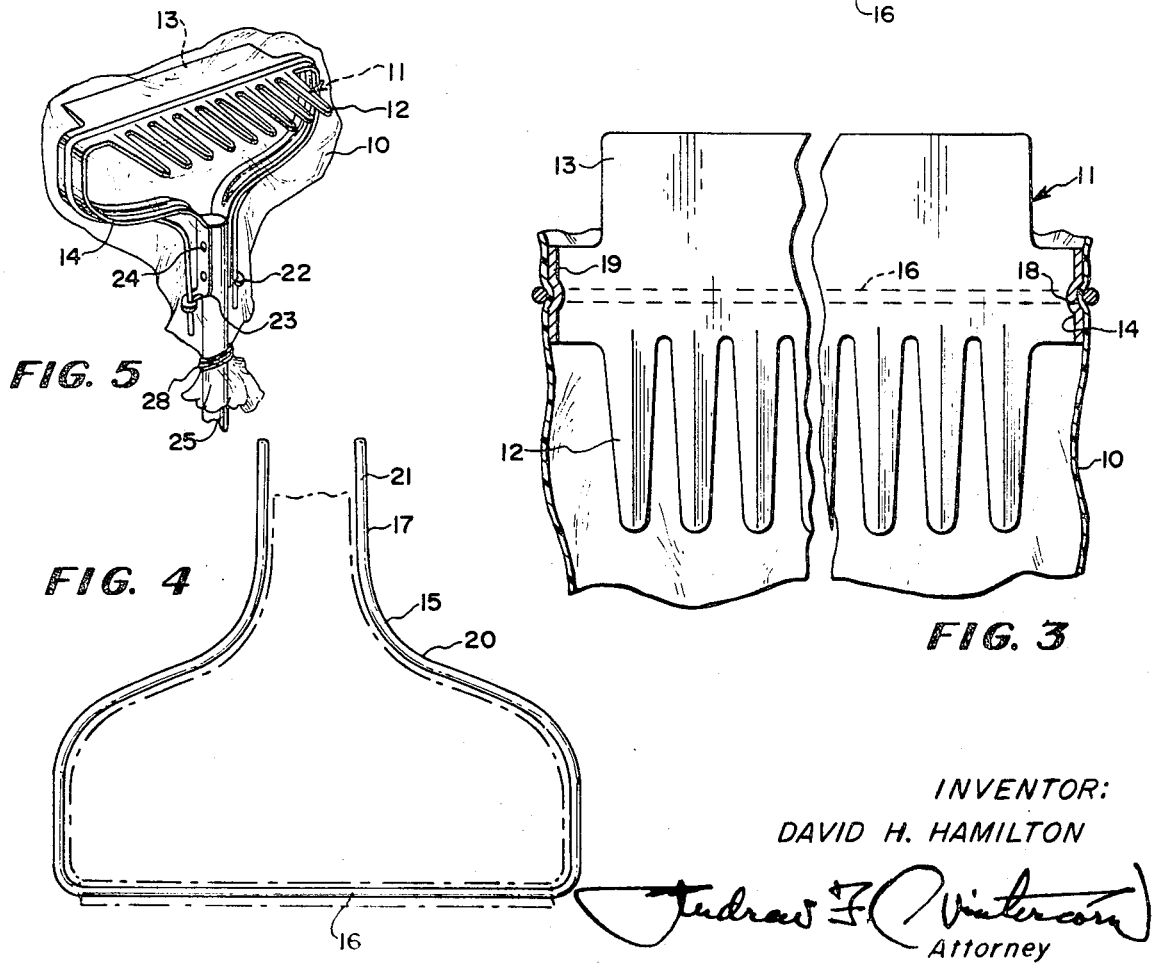
INVENTOR:
DAVID H. HAMILTON
Attorney

MULTI-PURPOSE HOUSEHOLD GARDEN AND YARD HAND TOOL

This invention relates to a multi-purpose household yard and garden tool, although its main purpose when fitted with a bag is for dog refuse collection and disposal, indoors and outdoors.

The hand tool, in accordance with my invention, has a yoke on one end of the handle with a scraping or hoe blade on one side and rake teeth on the other side in coplanar relationship, the blade portion being used most conveniently in scraping refuse from a cement floor in a garage, for example, whereas the rake teeth are used generally in raking out dog or other refuse from the lawn. The bag, for which a spring wire clip is supplied for fastening the mouth end to the yoke, is applied with either the blade forward or the rake teeth forward relative to the mouth of the bag in collecting the refuse. The spring wire clip is so designed and so fastenable that it can be left on the tool as it is not in the way when the hand tool is being used as a hoe or a rake in work around the yard and garden, but in cases where use of the hand tool is in dog refuse collection, a fresh bag may for sanitary reasons be applied over the yoke end of the tool when the blade or rake teeth have been soiled during the collection of dog refuse, whereby to seal off the yoke end of the tool when a tie-string or the like is applied around the mouth end of the bag closing it tightly around the handle. Clear plastic bags obtainable on the market at low cost and designed primarily for food wrapping are ideal for use on this hand tool for the other purpose mentioned, and the type having a pocket portion across one side of the mouth end is ideal for the present purpose as the cross-portion of the U-shaped wire clip can be entered in this pocket portion with the two arms of the clip piercing through the opposite ends of the pocket to embrace the mouth end of the bag spread open across the yoke, the free ends of the arms being snapped behind hooks provided on the handle end of the yoke on opposite sides of the handle, to secure the rest of the mouth end of the bag firmly in place along opposite sides of the yoke so it can't come off accidentally in the use of the tool for refuse collection.

The invention is illustrated in the accompanying drawing, in which:

FIG. 1 is a perspective view of the hand tool with a bag applied thereto for refuse collection, the rake teeth being arranged for use in that operation;

FIG. 2 is a front view of the yoke end of the hand tool showing how the spring wire clip is fastened in place;

FIG. 3 is a section on line 3—3 of FIG. 2, showing how the mouth end of a bag is gripped by the spring wire clip, the hoe blade being exposed in this instance for use in refuse collection;

FIG. 4 is a detail of the spring wire clip, and

FIG. 5 is a perspective view showing how a bag may be used to surround and seal up the entire head for sanitary purposes after the hoe blade or rake teeth have been soiled.

The same reference numerals are applied to corresponding parts throughout these views.

Referring to the drawing, the bag 10 is shown in FIG. 1 attached to the head end of a hand tool 11 with the rake teeth 12 extending forwardly from inside the mouth of the bag and the hoe blade 13 rearwardly directed inside the bag. The mouth end of the bag 10 is spread open around the generally triangular yoke 14 and fastened in place by means of a generally U-shaped spring wire clip 15, the cross-portion 16 of which extends crosswise of the outer end of the yoke to grip one side of the bag the full width thereof while the two arms 17 of the clip 15, which fit in grooves 18 defined in the opposite sides 19 of the yoke, are adapted to hold the opposite sides of the mouth end portion of the bag 10 gripped securely in place on the opposite sides of the yoke, keeping the mouth end of the bag wide open for easy collection of refuse in the bag, whether the blade 12 is disposed extending forwardly from inside the mouth of the bag or the rake teeth 13 are used. The arms 17 converge, as seen in FIGS. 2 and 4, to conform to the converging side portions of the yoke 14, as shown at 20, and grip the mouth end portion of the bag 10 on opposite sides of the yoke 14, the parallel extremities 21 of the clip 15, which are normally spread apart to the extent indicated in dotted lines in FIG. 2 are pressed together to snap into place inside the two hooks 22 provided as integral projections on the end of the substantially half-round attaching portion 23 of the yoke 14 that are secured, as by means of rivets 24, to one end portion of the handle 25. The yoke 14 is provided as a stamped sheet metal part or even as an aluminum alloy casting, and should, therefore, be available at low cost.

The bags 10 that I prefer to use are of clear plastic material available on the market at low cost and designed primarily for food wrappers and provided with a pocket portion 26 across one side of the mouth end, which I have found is ideal for use with the present hand tool, because the cross-portion 16 of the wire clip 15 fits neatly inside this pocket portion with the arms 17 extending through holes 27 pierced in the opposite ends of the pocket portion 26, as seen in FIG. 1, so that all that remains is to spread the rest of the mouth end of the bag 10 around the yoke 14 and apply the clip 15 to the yoke to fasten the bag in place, and when the hand tool is ready for refuse collection, either indoors with the blade portion 13 extending forwardly from inside the mouth of the bag, or outdoors using the rake teeth 12 extending forwardly relative to the mouth of the bag. Assuming that the hand tool is used at times for dog refuse collection and the blade 13 or rake 12 has been soiled in such an operation, one can for sanitary reasons apply a fresh bag 10 over the entire head end of the tool as shown in FIG. 5 and seal the mouth end of the bag with a tie-string or the like, as shown at 28, closing the mouth end of the bag tightly around the handle 25. This keeps the tool in sanitary condition and the bag used in that way can be applied to the tool later after the spring wire clip 15 has been applied to the pocket portion of the bag in the manner previously described, whatever contact there might have been between the inside of the bag and the soiled end of the blade 13 or rake 12 being of no consequence as that merely soiled the inside of the bag near the bottom thereof, leaving the mouth end portion of the bag clean.

In operation, after the premises have been cleared of refuse by collection in a bag 10, the bag is removed from the hand tool 11 and the mouth end of the bag is closed tightly before throwing the bag into an incinerator or garbage can. As previously stated, if the hand tool is used for dog refuse collection, a fresh bag 10 may be used as a sanitary cover for the soiled head end, as shown in FIG. 5, but otherwise it is a simple matter to wash it clean under a faucet or with water from the nozzle of a garden hose.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In combination, in a device of the character described, a hand tool comprising an elongated handle, a yoke in rigid relationship to one end of said handle and having a scraping blade extending forwardly from one side and rake teeth extending forwardly from the other side in substantially coplanar relationship to one another and with said blade for use interchangeably of said blade or rake, a disposable receptacle inside the open mouth end of which the yoke may be disposed with either the blade or rake in abutting substantially coplanar relationship with one side portion thereof and extending forwardly therefrom, and means for detachably securing said receptacle onto said yoke.

2. A device as set forth in claim 1 wherein the receptacle is a bag and the yoke is generally of open triangular shape and wherein the blade and rake extend from opposite sides of the base of the triangle with the apex portion of the triangle rigid with one end of the handle, the means for detachably securing said bag to said yoke comprising a generally U-shaped wire clip surrounding the yoke and securing the open mouth end of the bag onto the three sides of the yoke, and there being means for detachably securing the clip onto the yoke.

3. A device as set forth in claim 2 wherein the U-shaped wire clip fits into recesses provided therefor on the yoke to better grip and secure the open mouth end of the bag on the yoke.

4. A device as set forth in claim 2 wherein the U-shaped wire clip is of spring wire and when closed around the yoke to grip the open mouth portion of a bag has the two arms of the U closed on opposite sides of the yoke, there being means for holding these arms in closed relationship to the yoke.

5. A device as set forth in claim 2 wherein the U-shaped wire clip is of spring wire and when closed around the yoke to grip the open mouth portion of a bag has the two arms of the U closed on opposite sides of the yoke, there being inwardly facing hooks on opposite sides of the yoke at the handle end in which the arms of the U-shaped wire clip are adapted to be engaged to hold the same in closed relationship to the yoke.

6. In combination in a device of the character described, a hand tool comprising an elongated handle, a yoke in rigid relationship to one end of said hanle and having refuse gathering means extending from one side thereof in a plane transverse to the handle, a disposable receptacle inside the open mouth and of which the yoke fits with said refuse gathering means in abutting substantially coplanar relationship with one side portion and extending forwardly therefrom, and means for detachably securing said receptacle onto said yoke.

7. A device as set forth in claim 6 in which the receptacle is a bag the mouth of which is as wide as the yoke and on the outer side of which is a pocket opening away from the mouth and of a length to accommodate the full length of the cross-portion of a U-shaped wire clip for fastening the bag onto the yoke the full width thereof, the arms of the clip extending through holes made in the bag at opposite ends of the pocket and these arms serving to grip the rest of the open mouth of the bag onto opposite sides of the yoke, and there being means for detachably securing the clip in bag holding relationship to the yoke.

8. A device as set forth in claim 1 wherein the receptacle is a bag and the yoke is generally of open triangular shape and wherein the refuse gathering means extends from one side of the base of the triangle with the apex portion of the triangle rigid with one end of the handle, the means for detachably securing said bag to said yoke comprising a generally U-shaped wire clip surrounding the yoke and securing the open mouth end of the bag onto the three sides of the yoke, and there being means for detachably securing the clip onto the yoke.

9. A device as set forth in claim 8 wherein the U-shaped wire clip fits into recesses provided therefor on the yoke to better grip the open mouth end of the bag on the yoke.

10. A device as set forth in claim 8 wherein the U-shaped wire clip is of spring wire and when closed around the yoke to grip the open mouth portion of a bag has the two arms of the U closed on opposite sides of the yoke, there being means for holding these arms in closed relationship to the yoke.

11. A device as set forth in claim 8 wherein the U-shaped wire clip is of spring wire and when closed around the yoke to grip the open mouth portion of a bag has the two arms of the U closed on opposite sides of the yoke, there being inwardly facing hooks on opposite sides of the yoke at the handle end in which the arms of the U-shaped wire clip are adapted to be engaged to hold the same in closed relationship to the yoke.

12. A device as set forth in claim 1 wherein said receptacle is of a size to accommodate the entire yoke end of the hand tool therein, the mouth end of the receptacle being thereafter closeable onto the handle, and there being means for holding the mouth end in closed substantially sealed relationship to the handle.

13. A hand tool comprising an elongated handle having an open generally triangular yoke mounted by its apex portion on one end of said handle, and a hoe blade and rake teeth rigid with and extending from opposite sides of the base portion of said triangular yoke substantially the full width thereof in coplanar relationship to one another and to said base portion, and means for fastening the mouth portion of a refuse collecting receptacle onto said yoke with either the blade or the rake extending outwardly from one side of the mouth portion in substantially coplanar relationship thereto.

* * * * *